(12) United States Patent
Kim

(10) Patent No.: US 12,404,650 B2
(45) Date of Patent: Sep. 2, 2025

(54) RETAINING WALL STRUCTURE

(71) Applicant: Hun Su Kim, Seoul (KR)

(72) Inventor: Hun Su Kim, Seoul (KR)

(*) Notice: Subject to any disclaimer, the term of this patent is extended or adjusted under 35 U.S.C. 154(b) by 153 days.

(21) Appl. No.: 18/017,097

(22) PCT Filed: Aug. 26, 2021

(86) PCT No.: PCT/KR2021/011414
§ 371 (c)(1),
(2) Date: Jan. 20, 2023

(87) PCT Pub. No.: WO2022/071666
PCT Pub. Date: Apr. 7, 2022

(65) Prior Publication Data
US 2023/0295894 A1    Sep. 21, 2023

(30) Foreign Application Priority Data

Sep. 29, 2020 (KR) .................. 10-2020-0126847

(51) Int. Cl.
*E02D 29/02* (2006.01)
(52) U.S. Cl.
CPC ..... *E02D 29/0291* (2013.01); *E02D 29/0241* (2013.01); *E02D 29/025* (2013.01)
(58) Field of Classification Search
CPC ............ E02D 29/0291; E02D 29/0241; E02D 29/025; E02D 29/0266; E02D 2300/0084; E02D 2600/20; E02D 2600/40; E02D 17/20; E02D 17/202; E02D 17/205; A01G 9/025
See application file for complete search history.

(56) References Cited

U.S. PATENT DOCUMENTS

| 2005/0005566 A1* | 1/2005 | Kim ................... E02D 29/0225 52/719 |
| 2012/0027528 A1* | 2/2012 | Alfreds ................. E02D 17/202 405/284 |
| 2016/0017566 A1* | 1/2016 | Callewaert ............ E02D 29/025 403/283 |

FOREIGN PATENT DOCUMENTS

| CN | 2818555 Y | 9/2006 |
| KR | 10-0752152 B1 | 8/2007 |

(Continued)

OTHER PUBLICATIONS

International Search Report for PCT/KR2021/011414 mailed Jan. 5, 2022 from Korean Intellectual Property Office.

*Primary Examiner* — Amber R Anderson
*Assistant Examiner* — Stacy N Lawson
(74) *Attorney, Agent, or Firm* — Revolution IP, PLLC

(57) ABSTRACT

A retaining wall structure of the present invention is a retaining wall structure comprising soil bags, each including: top and bottom surface portions having the largest area among surfaces constituting a soil bag body; and long side surface portions and short side surface portions forming side surfaces of the soil bag body between the top and bottom surface portions, wherein each of the long side surface portions of the soil bags is arranged to face the ground, the soil bags are stacked such that the long side surface portions are in contact with each other in the vertical direction with respect to the ground, the soil bags are arranged such that the short side surface portions are in contact with each other in the lateral direction with respect to the ground, and auxiliary retaining walls that are respectively disposed behind the stacked soil bags are provided.

2 Claims, 9 Drawing Sheets

(56) References Cited

FOREIGN PATENT DOCUMENTS

| KR | 10-2008-0046351 A |   | 5/2008 |   |
|----|-------------------|---|--------|---|
| KR | 10-2010-0030726 A |   | 3/2010 |   |
| KR | 2010030726 A | * | 3/2010 |   |
| KR | 2010067565 A | * | 6/2010 |   |
| KR | 2010082926 A | * | 7/2010 |   |
| KR | 10-2013-0067498 A |   | 6/2013 |   |
| KR | 2020065913 A | * | 6/2020 | ............. A01G 24/44 |

* cited by examiner

【Figure 1】
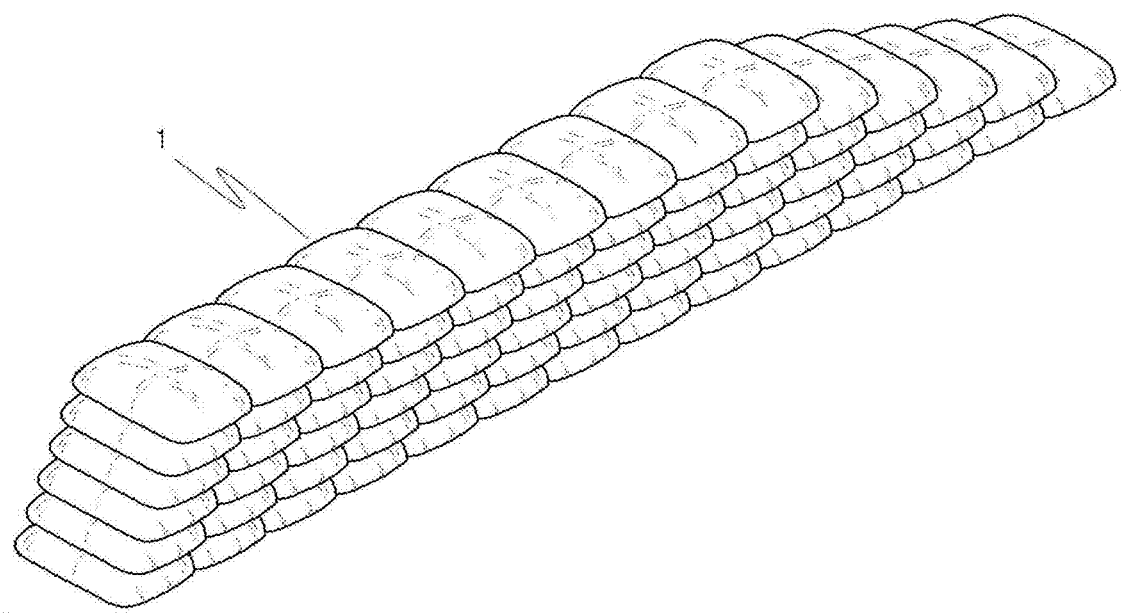
Prior Art
【Figure 2】
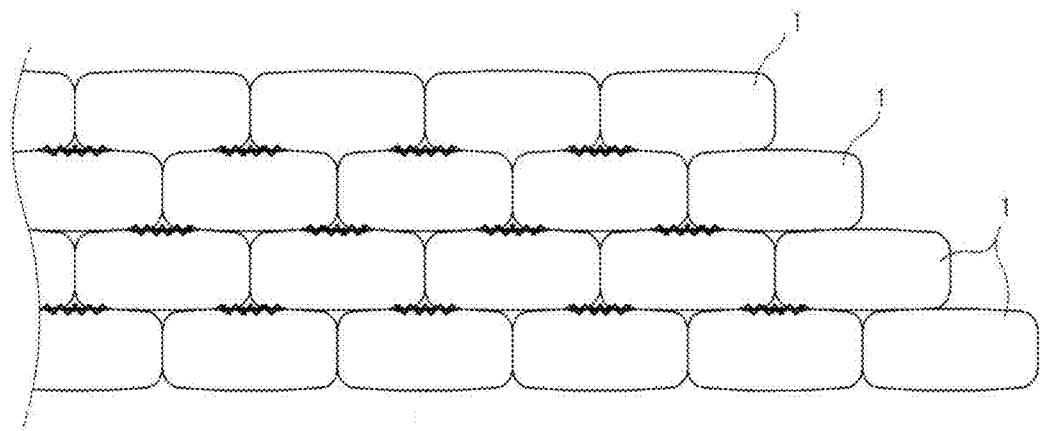
Prior Art

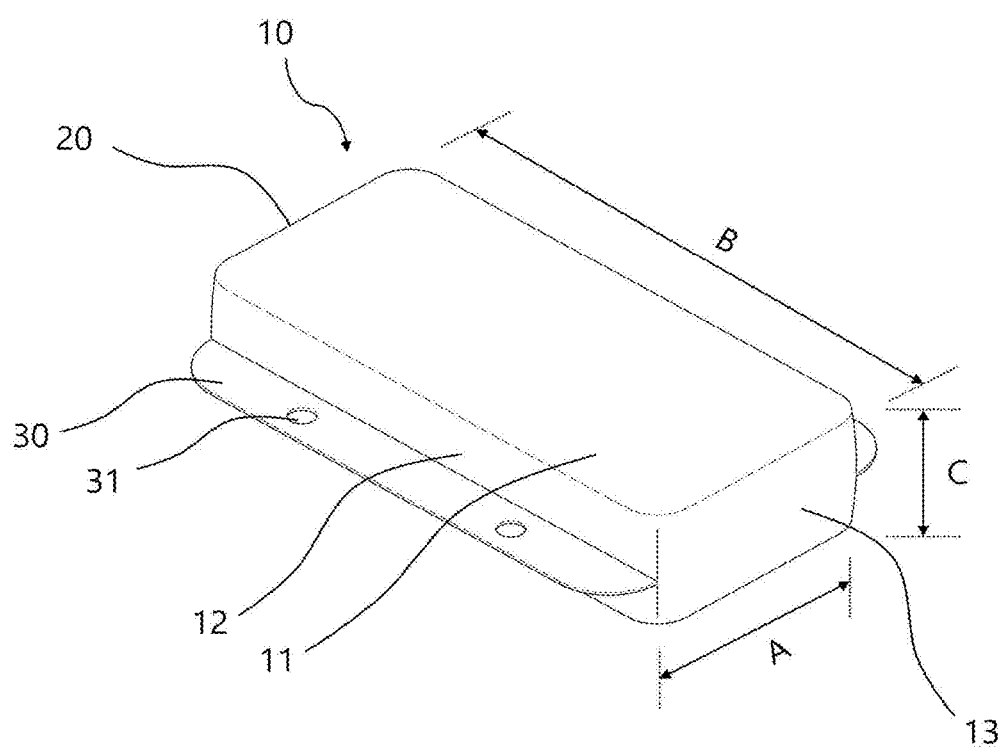
[Figure 3]

【Figure 4】
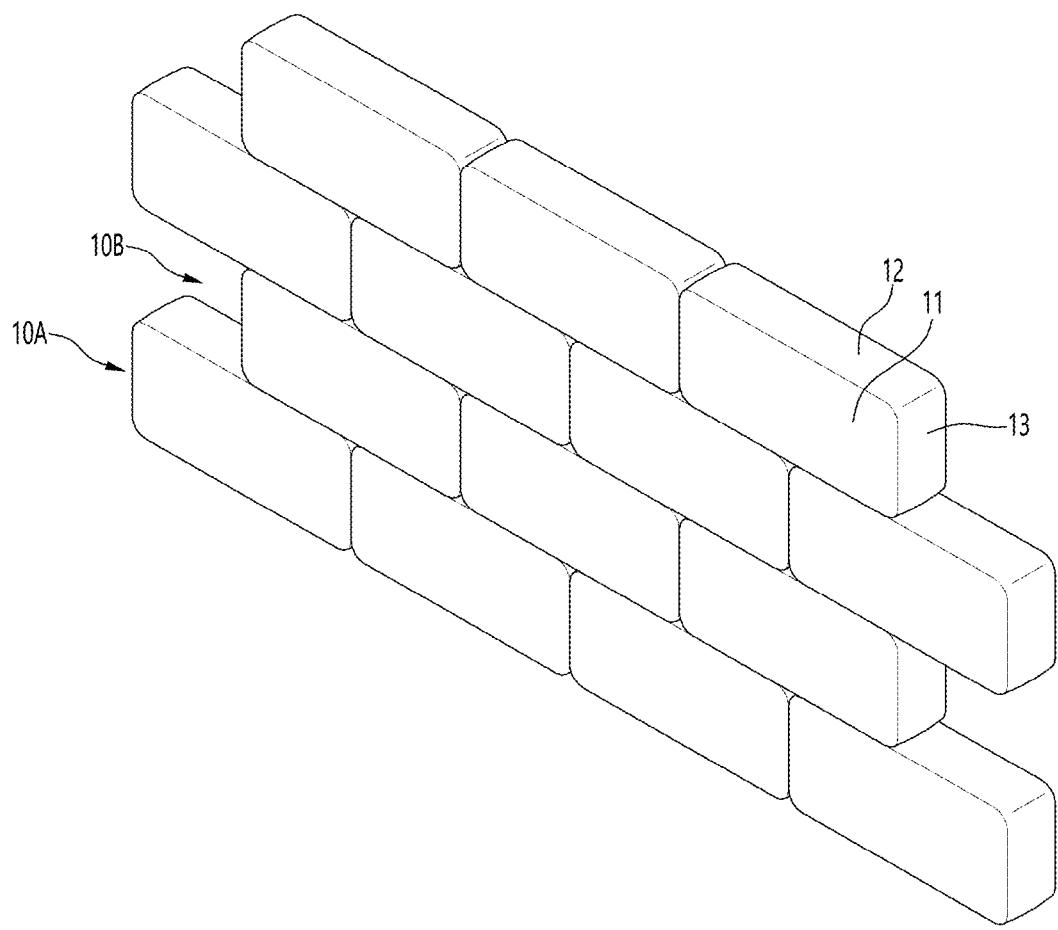

[Figure 5]
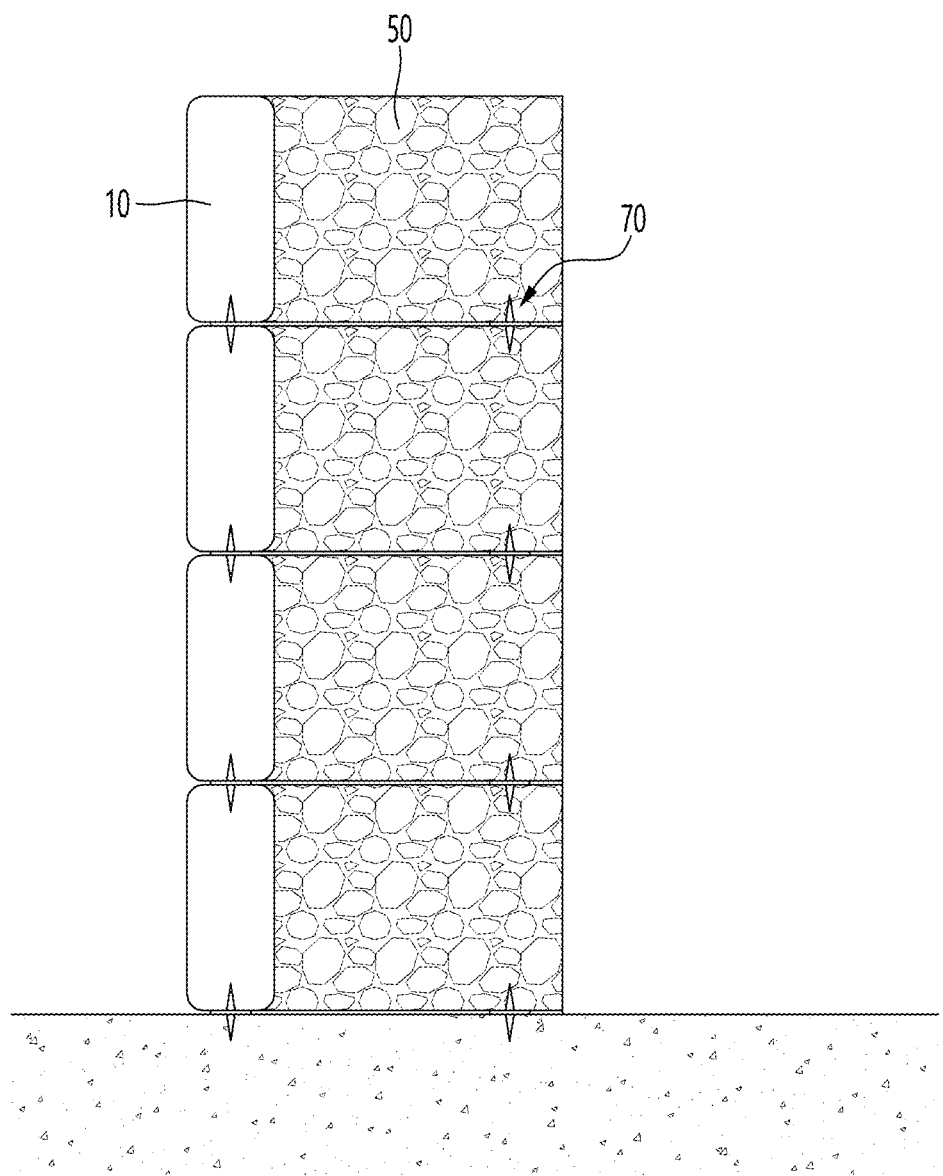

[Figure 6]
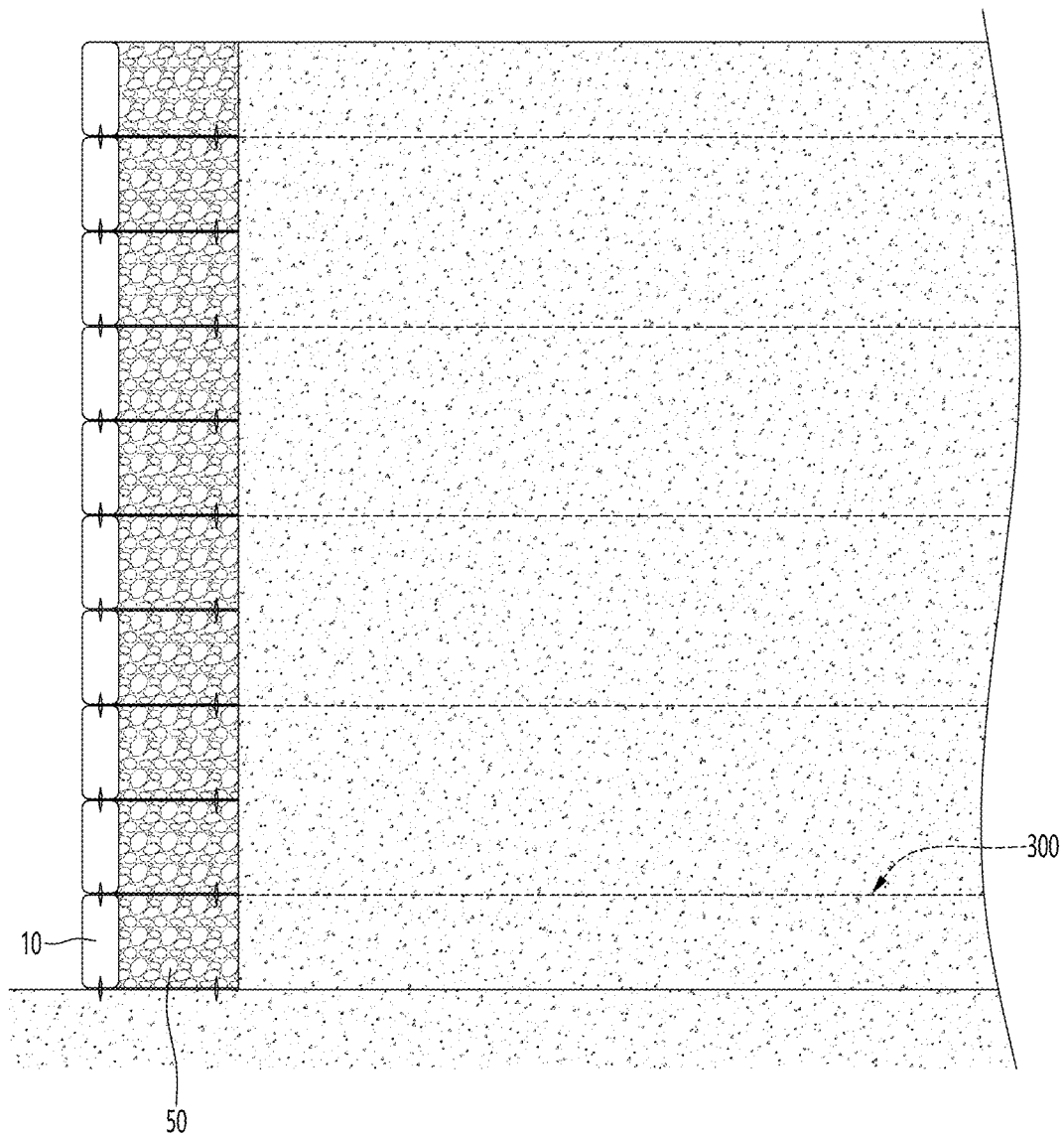

[Figure 7]
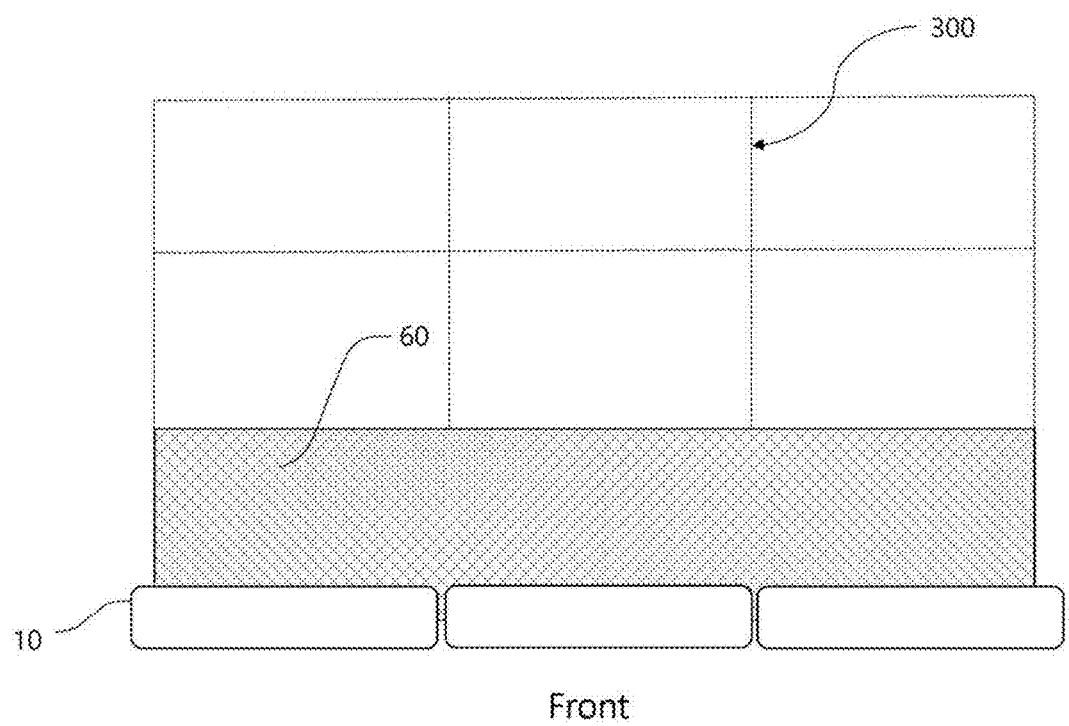

[Figure 9]
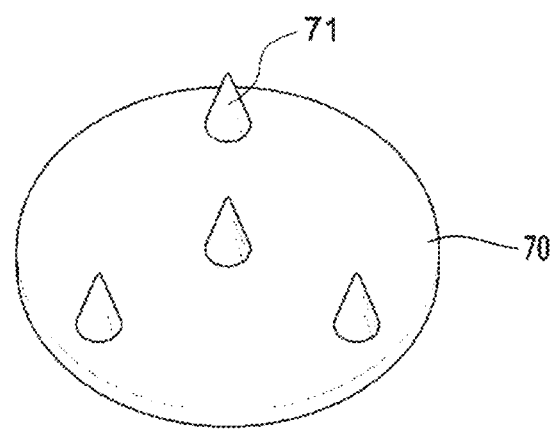

[Figure 10]
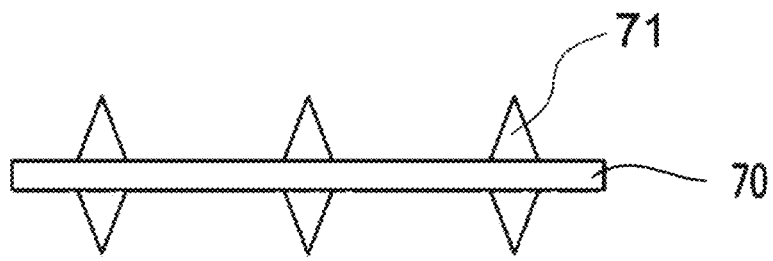

RETAINING WALL STRUCTURE

CROSS REFERENCE TO PRIOR APPLICATIONS

This application is the 35 U.S.C. 371 national stage of International application PCT/KR2021/011414 filed on Aug. 26, 2021; which claims priority to Korean Patent Application No. 10-2020-0126847 filed on Sep. 29, 2020. The entire contents of each of the above-identified applications are hereby incorporated by reference.

TECHNICAL FIELD

The present invention relates to a retaining wall structure, and more particularly, to a retaining wall structure capable of significantly reducing a cost by constructing a retaining wall by using a small number of soil bags, ensuring strength as a retaining wall, and obtaining an excellent drainage effect.

BACKGROUND ART

In general, a retaining wall refers to a structure installed to prevent a loss of soil in a region where the soil collapses easily due to a pressure of the soil, such as a roadside or a foot of a mountain, so that robustness and stability of the structure may be ensured.

Currently, there are a great variety of installation schemes and types of retaining walls, and the most traditional scheme is a scheme of installing a steel net on a construction point, injecting mixed concrete, and solidifying the mixed concrete. However, such a scheme may have disadvantages in that a construction scale of the scheme is very large, a construction difficulty is high, and a construction period is long because a time required for solidifying the mixed concrete is relatively long.

To compensate for disadvantages of a conventional retaining wall structure, currently, a method for stacking bags to complete a retaining wall is frequently used. In a case of such a method, after the bag is filled with sand/soil and the like, the bags may be connected to and stacked on each other in a longitudinal direction or a lateral direction to complete the retaining wall. In this case, a connection fixing component may be installed between bags that are adjacent to each other, so that the bags may be more firmly fixed to each other without slipping.

However, it was found that the retaining wall structure completed by connecting and fixing the bags that are adjacent to each other by using the connection fixing component does not have enough strength to withstand strong rain and wind, and a wall body is easily damaged under a harsh environment such as sandstorm (sandy wind) such as yellow dust.

(Patent Document 1) CN2006200547368 ZL

In addition, in many cases, the retaining wall is constructed by using an item called a soil bag filled with sand or soil. For example, as shown in FIGS. 1 and 2, in many cases, the retaining wall is formed by arranging a plurality of soil bags 1 in the lateral direction and stacking soil bags on the soil bags 1.

Soil bags that are conventionally used may have a shape in which one of a width or a length is longer the other while the shape has a predetermined thickness. As shown in FIGS. 1 and 2, the retaining wall has been constructed by arranging soil bags to be adjacent to each other so that longitudinal sides that are longer than lateral sides may make contact with each other or arranging the soil bags to be adjacent to each other so that the lateral sides may make contact with each other, and stacking soil bags on the arranged soil bags.

DISCLOSURE

Technical Problem

An object of the present invention is to propose a retaining wall structure capable of significantly reducing a cost for constructing a retaining wall by using a remarkably small number of soil bags, and increasing strength as a structure.

Technical Solution

According to the present invention, there is provided a retaining wall structure including soil bags, in which each of the soil bags includes top and bottom surface portions having a largest area among surfaces constituting a soil bag body, and long side surface portions and short side surface portions forming side surfaces of the soil bag body between the top and bottom surface portions, wherein the soil bags are stacked such that the long side surface portion of the soil bag is arranged to face a ground, and the long side surface portions make contact with each other in a vertical direction with respect to the ground, the soil bags are arranged such that the short side surface portions make contact with each other in a lateral direction with respect to the ground, and the retaining wall structure includes an auxiliary retaining wall disposed on a rear side of the stacked soil bags.

Advantageous Effects

According to the retaining wall structure as proposed, a retaining wall having a high height can be constructed while reducing a number of soil bags used, and robustness and an excellent drainage effect can be achieved together with the auxiliary retaining wall.

DESCRIPTION OF DRAWINGS

FIGS. 1 and 2 are views showing a state in which a retaining wall is constructed with soil bags by a method according to the related art.

FIG. 3 is a view showing a soil bag constituting a retaining wall structure according to an embodiment of the present invention.

FIG. 4 is a view for describing a configuration of a retaining wall according to the embodiment of the present invention.

FIG. 5 is a view showing a section of the retaining wall structure constructed according to the present embodiment.

FIG. 6 is a view showing a case in which a geogrid is used in the retaining wall structure including soil bags and an auxiliary retaining wall according to the present embodiment.

FIG. 7 is a view showing a case in which a non-woven fabric or a plastic plate having a concavo-convex portion is used for the auxiliary retaining wall according to the present embodiment.

FIGS. 9 and 10 are views showing a configuration of a connection plate according to another embodiment of the present invention.

MODE FOR INVENTION

Figure 8:
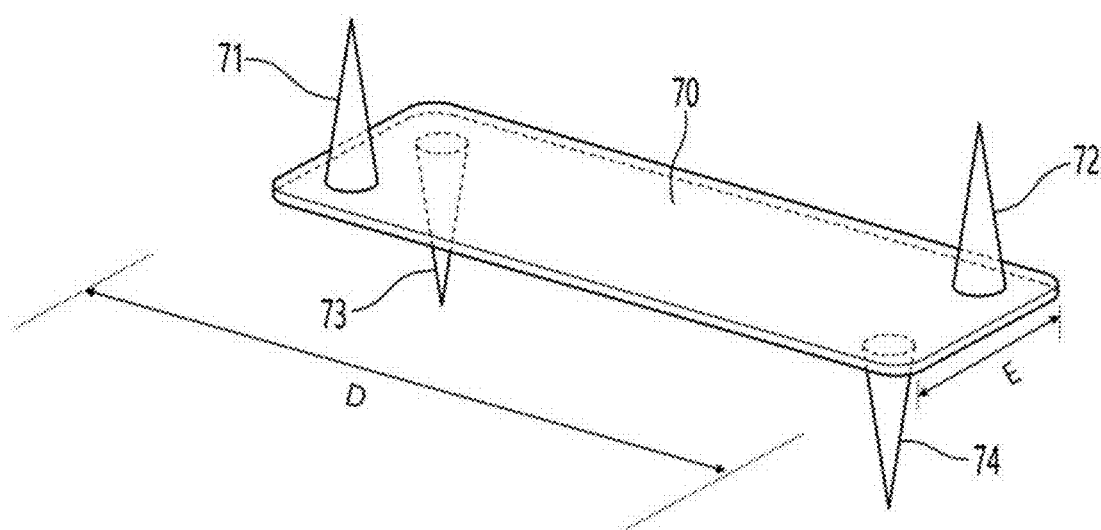
FIG. 8 is a view showing a configuration of a connection plate according to the embodiment of the present invention.

FIG. 3 is a view showing a soil bag constituting a retaining wall structure according to an embodiment of the present invention.

According to an embodiment, a soil bag 10 may be formed of a geotextile material having durability, and a fabric that allows water to flow through a protective bag and the soil bag and allows a seed to germinate. In addition, the protective bag and the soil bag may include fine soil particles and plant seeds that may germinate.

The soil bag 10 may have a rectangular shape having a lateral side A, a longitudinal side B, and a height C, in which the longitudinal side B has a longer length than the lateral side A. For example, the lateral side A may have a size of about 30 cm, the longitudinal side B may have a size of about 70 cm, and the height C may have a size of about 15 cm.

For reference, a soil bag before being filled with soil may have a size of 400 mm×880 mm, and a soil bag after being filled with soil may have a size of 300 mm×700 mm×150 mm.

The soil bag 10 may include a soil bag body 20 forming a body, and a plurality of soil bag blades 30 protruding from both sides of the soil bag body 20 by a predetermined thickness. The soil bag blade 30 may have two connection holes 31 formed at a predetermined interval so that other structures such as a wire mesh or a geogrid may be connected through a hook.

In particular, the soil bag body 20 of the soil bag 10 may include: top and bottom surface portions 11 having a largest area among surfaces constituting the soil bag body; and long side surface portions 12 and short side surface portions 13 forming side surface of the soil bag body between the top and bottom surface portions.

The short side surface portion 13 may have a smallest area among the surfaces constituting the soil bag body, and due to such a configuration, the soil bag body may have a rectangular parallelepiped shape on the whole.

Unlike a conventional construction scheme of constructing a retaining wall such that the top and bottom surface portions 11 make contact with a ground, and the top and bottom surface portions make contact with each other, the present invention will propose a construction scheme of constructing a retaining wall such that the long side surface portion 12 makes contact with the ground, and the long side surface portions 12 make contact with each other, rather than characteristics of the shape of the soil bag 10 itself.

FIG. 4 is a view for describing a configuration of a retaining wall according to the embodiment of the present invention.

Referring to FIG. 4, a retaining wall structure according to the present embodiment may be constructed by stacking a plurality of soil bags 10 such that long side surface portions 12 face each other in a vertical direction, and short side surface portions 13 make contact with each other in a lateral direction.

In addition, as shown in the drawing, after the long side surface portions 12 of the soil bags of a first layer 10A are arranged to make contact with the ground, soil bags may be stacked on the first layer 10A such that long side surface portions make contact with each other, in which soil bags of a second layer 10B may be located on a contact region of the soil bags of the first layer 10A.

FIG. 5 is a view showing a section of the retaining wall structure constructed according to the present embodiment, and FIG. 6 is a view showing a case in which a geogrid is used in the retaining wall structure including soil bags and an auxiliary retaining wall according to the present embodiment. FIG. 7 is a view showing a case in which a non-woven fabric or a plastic plate having a concavo-convex portion is used for the auxiliary retaining wall according to the present embodiment.

As described above, the soil bag may be stacked such that the long side surface portions 12 make contact with each other in the vertical direction, and an auxiliary retaining wall 50 may be provided to increase robustness as a retaining wall together with the soil bags.

Conventionally, there are cases in which soil bags are stacked such that top and bottom surfaces of the soil bags overlap each other to complete a retaining wall, and a geogrid is further provided to increase robustness of the retaining wall. Although the present embodiment may also use the geogrid, according to the present invention, the auxiliary retaining wall 50 may be provided together with the soil bags to further increase the robustness while using fewer soil bags as compared with a conventional retaining wall including soil bags. In other words, the auxiliary retaining wall 50 may constitute an outer wall as a retaining wall structure together with the soil bags, rather than replacing the conventional geogrid. Therefore, further installation of the conventional geogrid on a rear side may be selectively performed depending on a situation.

The auxiliary retaining wall 50 may be a configuration forming the retaining wall structure together with the retaining wall including the soil bags, and the auxiliary retaining wall 50 may add robustness as a retaining structure and facilitates drainage. To this end, the auxiliary retaining wall 50 may include a quarried stone layer such as gravel, and a non-woven fabric for suppressing an input of substances that hinder drainage, such as foreign substances, into the quarried stone layer may be further provided on the quarried stone layer.

In addition, FIG. 7 shows the soil bag 10 and the auxiliary retaining wall when viewed from the top, in which a non-woven fabric 60 may be arranged when the auxiliary retaining wall is formed on a rear side of the soil bag 10, the quarried stone layer such as gravel may be provided on the non-woven fabric 60, and when a plurality of non-woven fabrics or plastic plates having a plurality of holes are installed in the middle of the auxiliary retaining wall, the non-woven fabrics or the plastic plates may be arranged on a side surface of the retaining wall structure (left and right in FIG. 7).

In order to fix the auxiliary retaining wall 50 and the soil bag 10, a fixing net may be provided, and the fixing net may fix the auxiliary retaining wall 50 and the soil bag 10 by a connection plate 70. The connection plate 70 may be provided between the soil bags 10 in the vertical direction, and both ends of the fixing net may be coupled to the soil bag 10 and the auxiliary retaining wall 50 by the connection plate 70, respectively.

The connection plate 70 will be described below with reference to the accompanying drawings.

Meanwhile, referring to FIGS. 6 and 7, according to the present invention, the auxiliary retaining wall 50 may serve as the retaining wall structure together with the soil bags 10 stacked in the vertical and lateral directions, and a geogrid 300 that is conventionally used may be used on a rear side of the retaining wall.

In other words, soil such as gravel or on-site soil may be hardened on the rear side of the retaining wall including the soil bag 10 and the auxiliary retaining wall 50, and the geogrid 300 may be disposed on the soil, so that robustness of an entire structure may be further increased.

As shown in FIG. 6, the present invention relates to a retaining wall that serves as an outer wall in a place that has a risk of collapse or needs to be greened, and the auxiliary retaining wall has to be prevented from being separated from the soil bag. In other words, this is because the auxiliary retaining wall constitutes the retaining wall that forms an exterior together with the soil bags stacked in the vertical and lateral directions.

FIG. 8 is a view showing a configuration of a connection plate according to the embodiment of the present invention.

According to the present embodiment, the connection plate 70 may be placed on a side surface defined by the longitudinal side and the height of the soil bag according to the embodiment, and in order to allow at least one connection plate 70 to be arranged on the side surface (long side surface portion) of the soil bag, a long side of the connection plate 70 may be smaller than the longitudinal side of the soil bag, which is 70 cm, and a short side of the connection plate may be smaller than the height of the soil bag, which is 15 cm.

More preferably, in order to allow at least 1.5 connection plates 70 to be placed on the side surface of the soil bag, the long side (D of FIG. 8) of the connection plate 70 may have a size of 20 to 30 cm that is smaller than ½ of 70 cm, which is the longitudinal side of the soil bag, and the short side (E of FIG. 8) of the connection plate 70 may have a size of about 10 to 13 cm that is slightly smaller than 15 cm, which is the height of the soil bag, for strong supporting strength of the soil bags stacked in the vertical and lateral directions.

In addition, according to the embodiment, a plurality of conical protrusions may be formed on each of top and bottom surfaces of the connection plate 70. As shown in the drawing, protrusions 71 and 72 formed on the top surface and protrusions 73 and 74 formed on the bottom surface may not formed at the same position. Due to such an arrangement of the protrusions, the protrusions may penetrate the soil bags stacked in the vertical direction so as to be inserted into the soil bags at mutually different positions of the soil bags, so that stronger supporting strength may be obtained.

For example, top surface protrusions 71 and 72 may be formed on an upper left corner and a lower right corner, respectively, and bottom surface protrusions 73 and 74 may be formed on an upper right corner and a lower left corner, respectively.

FIGS. 9 and 10 are views showing a configuration of a connection plate according to another embodiment of the present invention.

The connection plate 70 may have a shape of a disc formed on both surfaces thereof with at least one conical protrusion, and may serve to couple the soil bags arranged in the vertical direction so as to be in a vertical relation in terms of stacking positions. In other words, the connection plate 70 may be disposed between two soil bags 10 that are adjacent to each other to make close contact with each other in the vertical direction among the stacked soil bags 10 in each row, and the protrusions 71 formed on the top and bottom surfaces of the connection plate 70 may be inserted into the soil bag, so that the soil bag and the connection plate may be connected to each other.

The connection plate 70 may be formed of a non-corrosive material such as aluminum and plastic.

As the connection plate 70 is pressed by a load of the soil bags 10 located on the connection plate 70, the conical protrusions 71 formed on the bottom surface of the connection plate 70 may be pressed into the soil bag 10 located under the connection plate 70, so that the soil bags 10 in each row may be connected to each other. In addition, the connection plate 70 may also be used to fix a position of the fixing net formed on the auxiliary retaining wall.

As shown in FIG. 10, three conical protrusions may be formed on the both surfaces of the connection plate 70. According to the present embodiment, such a number of the conical protrusions is not significant, one or two conical protrusions may be formed on the both surfaces of the connection plate 70, and numbers of the conical protrusions formed on the both surfaces may be different from each other. However, the soil bag 10 may be torn when a size of the conical protrusion is too large, and the soil bags 10 in each row may be insufficiently connected to each other when the size of the conical protrusion is too small, so that it is preferable to form a larger number of conical protrusions having a small size on the both surfaces of the connection plate 70.

INDUSTRIAL APPLICABILITY

The present invention may be utilized in various places as a retaining wall structure, so that the present invention has industrial applicability.

The invention claimed is:

1. A retaining wall structure comprising:
   soil bags, each soil bag including front and rear surface portions having the largest area among surfaces constituting each soil bag, and
   long side surface portions and short side surface portions forming side surfaces of each soil bag between the front and rear surface portions;
   an auxiliary retaining wall including a quarried stone layer composed of gravel and a fixing net provided on the quarried stone layer
   such that the auxiliary retaining wall is formed as a part of the retaining wall structure together with the soil bags,
   wherein the soil bags are stacked such that the long side surface portions of vertically adjacent soil bags are in contact with each other,
   wherein the soil bags are arranged such that the short side surface portions of laterally adjacent soil bags are in contact with each other,
   wherein the rear surface portion of each soil bag faces a front of the auxiliary retaining wall such that the auxiliary retaining wall is disposed on a rear side of the stacked soil bags; and
   a connection plate disposed at an interface between an upper one of the soil bags and a lower one of the soil bags that are vertically adjacent to each other,
   wherein the connection plate is made of a non-corrosive material selected from aluminum or plastic and has
      a longitudinal length of 20-30 cm which is less than half of a length of the long side surface portion of each soil bag, and
      a transverse length of 10-13 cm which is less than a height of each soil bag,
   wherein the connection plate comprises a plurality of conical protrusions formed on each of a top surface and a bottom surface of the connection plate, the plurality of conical protrusions consisting of:
      a first conical protrusion being formed at a lower left corner of the top surface;
      a second conical protrusion being formed at an upper right corner of the top surface;

a third conical protrusion being formed at an upper left corner of the bottom surface; and a fourth conical protrusion being formed at a lower right corner of the bottom surface, such that the plurality of conical protrusions on the top and bottom surfaces are at different positions relative to each other, wherein the first and second conical protrusions on the top surface of the connection plate are configured to be inserted into an upper soil bag of the stacked soil bags and the third and fourth conical protrusions on the bottom surface are configured to be inserted into a lower soil bag of the stacked soil bags, thereby interconnecting the upper and lower soil bags, wherein one side of the fixing net is coupled to the soil bags and an opposite side of the fixing net is coupled to the auxiliary retaining wall, thereby securing the soil bags and the auxiliary retaining wall together.

2. The retaining wall structure of claim 1, wherein each of the soil bags has a lateral side length of 30 cm, a longitudinal side length of 70 cm, and a height of 15 cm, wherein a compacted soil layer formed of gravel or on-site soil is provided on a rear side of the auxiliary retaining wall, and a geogrid is disposed on the compacted soil layer.

* * * * *